UNITED STATES PATENT OFFICE.

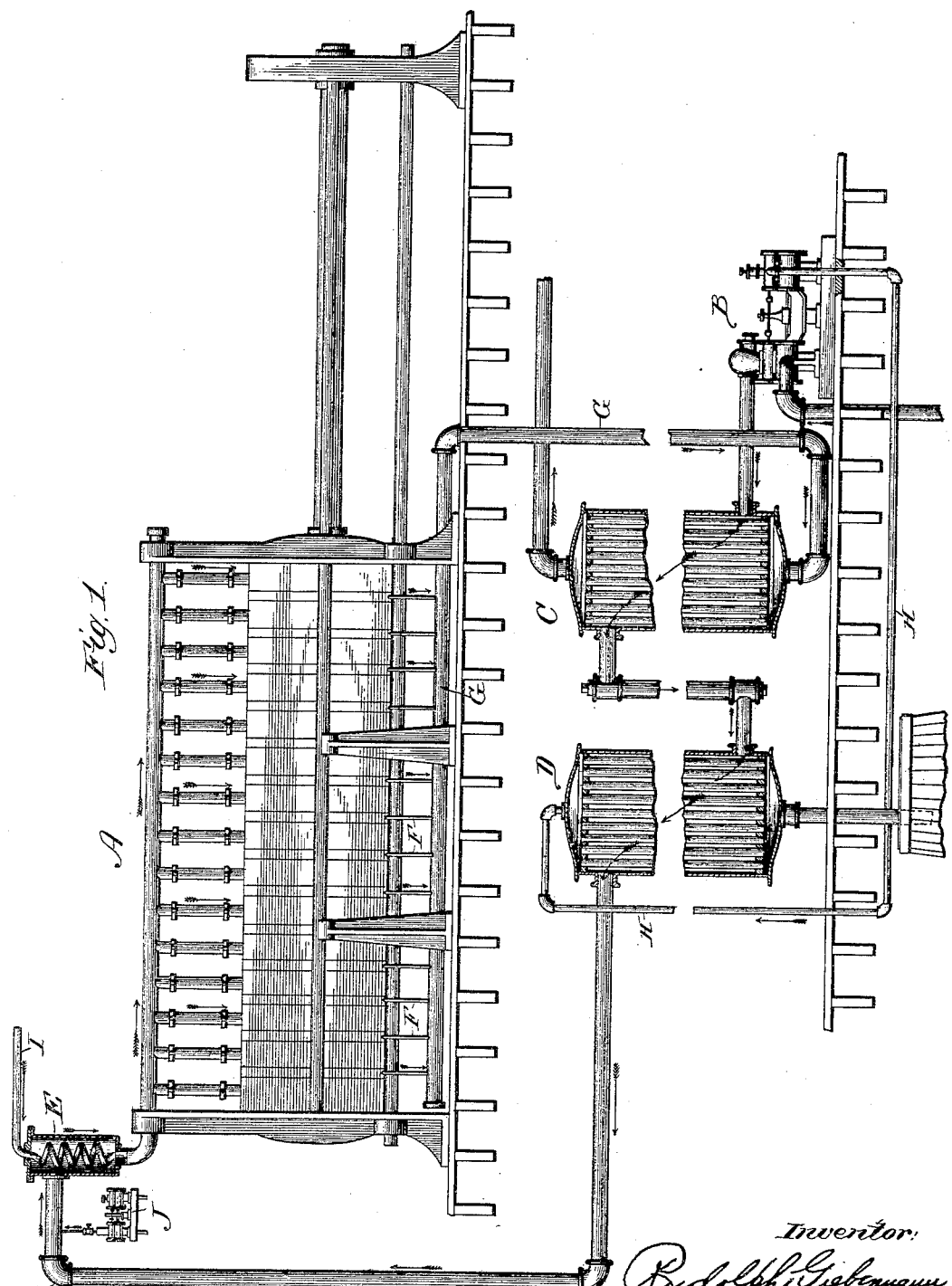

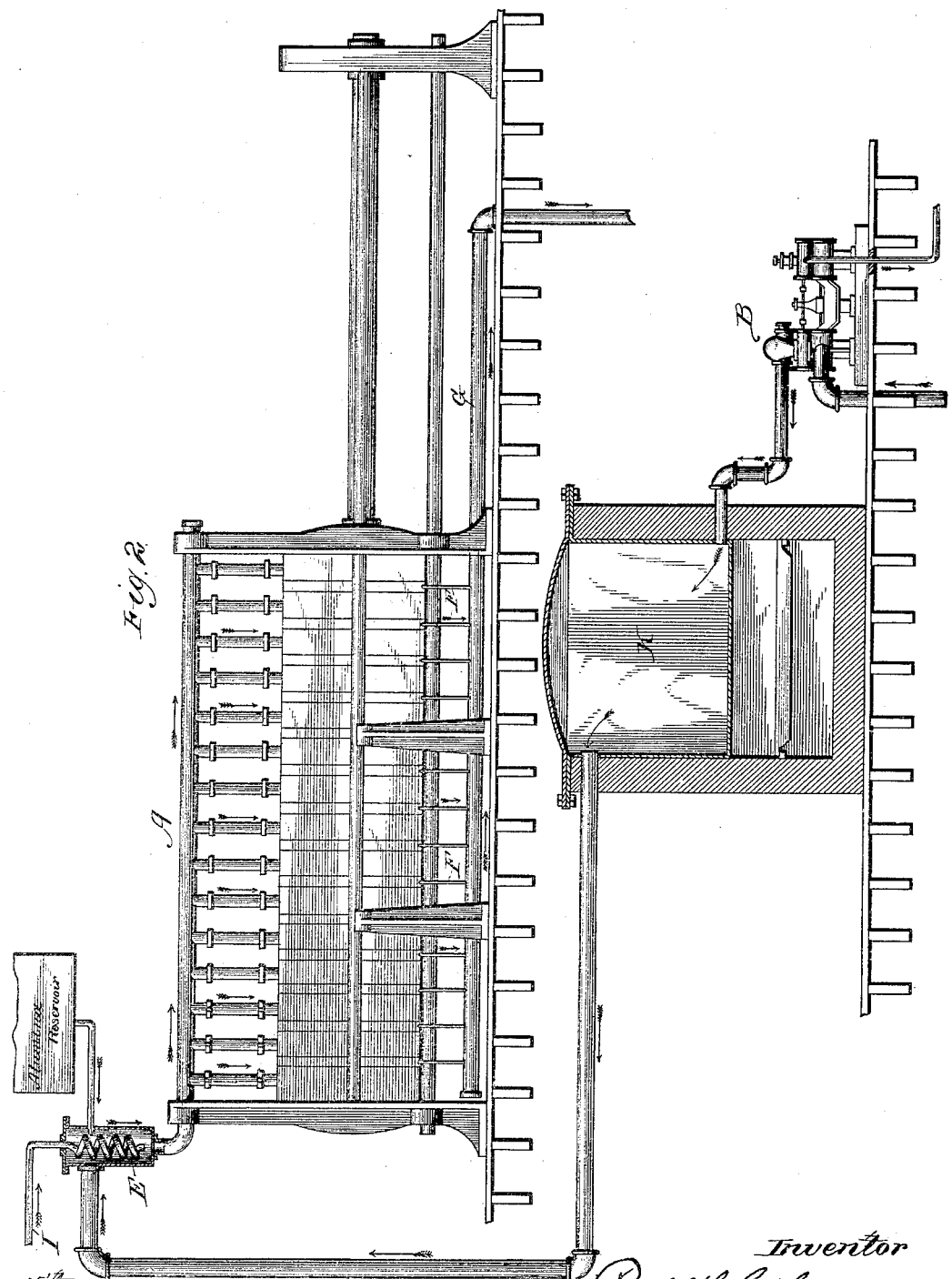

RUDOLPH GIEBERMANN, OF CHICAGO, ILLINOIS, ASSIGNOR OF ONE-HALF TO THE BOUTON FOUNDRY COMPANY, OF SAME PLACE.

PROCESS OF SEPARATING GLUTEN FROM SLAUGHTER-HOUSE WASHINGS.

SPECIFICATION forming part of Letters Patent No. 445,055, dated January 20, 1891.

Application filed September 16, 1890. Serial No. 365,162. (No specimens.)

*To all whom it may concern:*

Be it known that I, RUDOLPH GIEBERMANN, a citizen of the United States, and a resident of the city of Chicago, in the county of Cook and State of Illinois, have invented certain new and useful Improvements in Processes for Separating Gluten from Slaughter-House Washings, of which the following is a specification.

The water used in washing freshly-slaughtered animals during the dressing operation contains a good percentage of blood, fat, glue, &c., ordinarily designated as "gluten," which at the present time is run off into a river or sewer with the washings, causing the water to exhale noxious, disagreeable, and unhealthful odors, which taint the atmosphere around the slaughter-house and frequently to a considerable distance therefrom, rendering life a burden anywhere within a radius of several miles of the slaughter-house and often causing sickness and a depreciation of real-estate value in the neighborhood of the slaughter-house. If, however, this gluten were separated from the washings, it would be a valuable by-product and an article of commerce, being one of the best fertilizers known; but when contained in the water it cannot be used as a fertilizer, and is therefore at the present time a waste product.

The prime object of this invention is to separate the gluten from the slaughter-house washings and to reduce it to a convenient and marketable form, thus converting into a valuable by-product what has heretofore been wasted and at the same time cleanse and purify the water used in the slaughtering and dressing of cattle, so as to prevent the giving off thereby of noxious and unhealthful odors.

Another object is to avoid the necessity for storing the washings in order to separate the gluten therefrom, as has heretofore been customary, by separating the gluten from the washings during the continuous flow of the latter, thereby producing a continuous and instantaneous precipitation of the gluten.

My process may be carried out by many different forms of apparatus, the essential feature thereof being the raising of the temperature of the washings nearly to the boiling-point or to a sufficient degree, in conjunction with an alumina compound mixed therewith at or just prior to the time of raising its temperature, to cause the instantaneous precipitation of the gluten from the washings; but for a better understanding of my invention and to enable others skilled in the art to which it appertains to practice the same I have illustrated in the drawings two different forms of apparatus for carrying out my invention, in which—

Figure 1 illustrates the preferred form of apparatus and the most economical and efficient now known to me, while Fig. 2 represents a more crude apparatus, but which is capable of carrying out my process, as are many other forms of apparatus which it is not necessary for me to herein refer to.

In practice the slaughter-house washings are sometimes cold and sometimes slightly warm, and I have found that the best results are produced by gradually raising the temperature of the washings to the desired point and then mixing the chemicals therewith; but the same result might be produced, but not in so thorough and satisfactory a manner, by raising the temperature of the washings to the desired point as quickly as possible by subjecting them to intense heat before reaching the precipitator, where the chemicals are mixed with them, instead of raising the temperature of the washings gradually.

An apparatus based upon the first-described principle is illustrated in Fig. 1, in which A represents a filter-press of any suitable construction; B, a force-pump; C and D, a pair of heaters connected together and connected, respectively, with the force-pump and a precipitator E, which latter is connected with the filter-press, one of said heaters being heated by the hot filtered water from the press, conducted thereto through discharge-spouts F and drain-pipe G, while the other is heated to a still higher temperature by the exhaust-steam from the pump B, with which it is connected by the pipe H in any suitable manner. The construction of the heaters is also immaterial, efficient service being gained by having tubular heaters through which the hot water and steam flow and around and between which the washings are forced by the pump.

The maximum temperature of the washings is gained in the precipitator E by introducing therein in any suitable manner through the pipe I live or superheated steam, which mixes with the washings, and also serves to assist the force-pump in forcing the washings through the filter. The subjection of the washings to this heat alone would not be sufficient to cause the precipitation of the gluten contained in the washings; but by introducing an alumina compound into the washings at or just prior to their discharge into the precipitator the precipitation of the gluten will be rendered instantaneous and continuous, taking place as rapidly as the washings are forced into the precipitator. This alumina compound may be introduced into the precipitator direct or into the pipe connecting the precipitator with one of the heaters adjacent to the precipitator, an efficient and convenient means for accomplishing this object being a small pump J, connected either with the pipe or precipitator and operating to inject into the washings a sufficient proportion of the alumina compound to produce the desired result.

As exemplifying an apparatus of the other class mentioned, in which the result is substantially the same, though accomplished in a slightly-different manner, I have shown in Fig. 2 a crude form of apparatus similar in its general characteristics to that just described, the main point of difference being that instead of the tubular heaters heated by the filtered water and exhaust-steam from the pump I have shown a furnace and boiler K, through the latter of which the washings are forced by the pump and during their passage are raised nearly to the desired temperature, and in fact they might be raised to the required temperature before being discharged into the precipitator without material detriment to the operation; but practice has demonstrated that the best results are attained by raising the temperature gradually and at or just prior to the time at which the required temperature is reached—say about 200° Fahrenheit—to mix therewith the alumina compound.

In the apparatus illustrated in Fig. 2 I have also shown the alumina compound introduced directly into the precipitator instead of into the pipe connecting the precipitator with the heater, and it is obvious that various other forms of apparatus might be employed for carrying out my process—such, for instance, as plain tanks instead of the tubular heaters, heated in any suitable manner, a gravity feed instead of the force-pump, a different form of precipitator, and any suitable form of filter-press—the construction and operation of the apparatus being immaterial to the process.

Heretofore in purifying slaughter-house washings, sewage, &c., it has been the common practice to run the washings into tanks and there mix with them alum or other chemicals, leaving them set for hours and sometimes for days until the desired precipitation takes place; but obviously such a method is wholly impracticable as applied to slaughter-houses of the present time, where hundreds of thousands of gallons of washings are run off each day, for it would require a greater storage capacity than the slaughter-house itself. By my process, however, no storage is necessary, for the separation of the gluten from the washings is instantaneous and continuous and effected as rapidly as the washings flow, so that there is practically no accumulation of the washings and no storage necessary other than a common reservoir into which all of the washings from the slaughter-house flow, besides which a valuable by-product in the shape of an excellent fertilizer is saved, which would otherwise be wasted if the washings were run directly into a sewer or river, as now ordinarily obtains at the larger slaughter-houses, and by the employment of a filter-press the gluten may be reduced to the form of cakes as rapidly as separated from the washings, convenient for the market and for subsequent use as a fertilizer.

Having described my invention, what I claim, and desire to secure by Letters Patent, is—

1. The herein-described process for separating gluten from slaughter-house washings, the same consisting in first raising the temperature of the washings to the desired degree, then introducing into the washings an alumina compound, and afterward passing the washings through a filter, substantially as described.

2. The herein-described process for separating gluten from slaughter-house washings, the same consisting in first gradually raising the temperature of the washings to the desired degree, then introducing into the washings an alumina compound, and finally passing the washings through a filter, substantially as described.

RUDOLPH GIEBERMANN.

Witnesses:
R. C. OMOHUNDRO,
W. R. OMOHUNDRO.